US012799778B2

(12) United States Patent
Wilke et al.

(10) Patent No.: US 12,799,778 B2
(45) Date of Patent: Nov. 17, 2026

(54) VEHICLE DOOR ACTUATING APPARATUS WITH A LARGE ACTUATING SURFACE

(71) Applicant: Illinois Tool Works Inc., Glenview, IL (US)

(72) Inventors: Zsolt Wilke, Bad Mergentheim (DE); Andreas Rudolf, Eibelstadt (DE); Fritz Göbel, Würzburg (DE); Martin Weid, Gollhofen (DE)

(73) Assignee: Illinois Tool Works Inc., Glenview, IL (US)

( * ) Notice: Subject to any disclaimer, the term of this patent is extended or adjusted under 35 U.S.C. 154(b) by 375 days.

(21) Appl. No.: 18/367,006

(22) Filed: Sep. 12, 2023

(65) Prior Publication Data

US 2024/0093537 A1 Mar. 21, 2024

(30) Foreign Application Priority Data

Sep. 21, 2022 (DE) ..................... 10 2022 124 289.7

(51) Int. Cl.
*E05B 81/76* (2014.01)
*E05B 85/10* (2014.01)
*E05B 1/00* (2006.01)

(52) U.S. Cl.
CPC .............. *E05B 81/76* (2013.01); *E05B 85/10* (2013.01); *E05B 1/0038* (2013.01)

(58) Field of Classification Search
CPC ........ E05B 81/76; E05B 85/10; E05B 1/0038; E05B 79/06
See application file for complete search history.

(56) References Cited

U.S. PATENT DOCUMENTS 681,075 A 8/1901 Perkins
1,081,319 A 12/1913 Ernest
(Continued)

FOREIGN PATENT DOCUMENTS

CN 108843162 A 11/2018
CN 108979368 A 12/2018
(Continued)

*Primary Examiner* — Christine M Mills
(74) *Attorney, Agent, or Firm* — McAndrews, Held & Malloy, Ltd.

(57) ABSTRACT

Described is a vehicle door actuating apparatus (100). The vehicle door actuating apparatus (100) includes an actuating surface (106), a sensor (140), such as an inductive sensor or switch, and a mechanism for transmitting a compressive force applied by a user to the actuating surface (106) into a movement that is detectable by the sensor. The mechanism includes a first component (111) or a first component group on which the switch (140) is at least partially fixed and a transmission element (120) that is pivotally arranged on the first component (111) or the first component group. The transmission element (120) is pivotable between a home position in which the sensor (140) is not triggered by the transmission element (120) and an actuating position in which the sensor (140) is triggered by the transmission element (120). The transmission element (120) is movable relative to the actuating apparatus (102). The vehicle door actuating apparatus (100) includes a plurality of actuating elements (158*a,* 158*b,* 158*c,* 158*d,* 158*e*) arranged in relation to the transmission element (120) such that a movement of at least one of the actuating elements (158*a,* 158*b,* 158*c,* 158*d,* 158*e*) relative to the transmission element (120) is sufficient in order to transfer the transmission element (120) from its home position into its actuating position.

20 Claims, 13 Drawing Sheets

(56) References Cited

U.S. PATENT DOCUMENTS

| | | | |
|---|---|---|---|
| 3,034,802 A | 5/1962 | Axtmann | |
| 3,712,362 A | 1/1973 | Alderfer | |
| 4,867,501 A | 9/1989 | Nomura | |
| 6,923,481 B2 | 8/2005 | Bruderick | |
| 7,062,945 B2 | 6/2006 | Saitoh | |
| 7,404,588 B2 | 7/2008 | Gabsch | |
| 7,621,573 B2 | 11/2009 | Thomas | |
| 8,089,228 B2 | 1/2012 | Ballard | |
| 8,443,553 B1 | 5/2013 | Polewarczyk | |
| 9,062,478 B2 | 6/2015 | Bingle | |
| 9,156,335 B1 | 10/2015 | Harter | |
| 9,458,649 B2 | 10/2016 | Fujiwara | |
| 9,643,487 B2 | 5/2017 | Szawarski | |
| D806,513 S | 1/2018 | Curic | |
| 10,052,947 B2 | 8/2018 | Herrmann | |
| 10,053,893 B1 | 8/2018 | Patel | |
| 10,253,533 B1 | 4/2019 | Pudney | |
| 10,435,924 B1 | 10/2019 | Salter | |
| 10,577,845 B2 | 3/2020 | Herczeg | |
| 10,615,534 B2 | 4/2020 | Herczeg | |
| 10,655,371 B2 | 5/2020 | Soonthornwinate | |
| 10,711,494 B2 | 7/2020 | Bingle | |
| 10,760,307 B2 | 9/2020 | Rocci | |
| 10,884,316 B2 | 1/2021 | Yoshizawa | |
| 10,897,936 B2 | 1/2021 | Berger | |
| 10,934,748 B2 | 3/2021 | Harajli | |
| 10,941,603 B2 | 3/2021 | Linden | |
| 10,988,962 B2 | 4/2021 | Park | |
| 11,027,646 B2 | 6/2021 | Kothe | |
| 11,040,615 B2 | 6/2021 | Herzig | |
| 11,085,212 B2 | 8/2021 | Rivaya | |
| 11,244,321 B2 | 2/2022 | Wu | |
| 11,248,403 B2 | 2/2022 | Boberschmidt | |
| 11,479,995 B2 | 10/2022 | Matthias | |
| 11,553,887 B2 | 1/2023 | Mclaughlin | |
| 11,560,741 B2 | 1/2023 | Guerin | |
| 11,821,245 B2 | 11/2023 | Herdering | |
| 2004/0177478 A1 | 9/2004 | Louvel | |
| 2005/0121924 A1 | 6/2005 | Chanya | |
| 2006/0279095 A1 | 12/2006 | Ishiguro | |
| 2008/0163555 A1 | 7/2008 | Thomas | |
| 2009/0058132 A1 | 3/2009 | Browne | |
| 2013/0079984 A1 | 3/2013 | Aerts | |
| 2013/0127185 A1 | 5/2013 | Lang | |
| 2014/0000167 A1 | 1/2014 | Patel | |
| 2014/0047877 A1 | 2/2014 | Bohm | |
| 2014/0300115 A1 | 10/2014 | Vasi | |
| 2015/0048644 A1 | 2/2015 | Georgi | |
| 2015/0315812 A1 | 11/2015 | Vasi | |
| 2016/0010369 A1 | 1/2016 | Specht | |
| 2016/0208523 A1 | 7/2016 | Bingle | |
| 2017/0066312 A1 | 3/2017 | Coutier | |
| 2018/0163442 A1* | 6/2018 | Soonthornwinate | E05B 81/76 |
| 2019/0078360 A1 | 3/2019 | Blount | |
| 2019/0100948 A1 | 4/2019 | Low | |
| 2019/0112842 A1* | 4/2019 | Wilke | H01H 3/04 |
| 2019/0112846 A1 | 4/2019 | Laval | |
| 2019/0234121 A1 | 8/2019 | Pudney | |
| 2019/0368239 A1 | 12/2019 | Rhein | |
| 2020/0308883 A1 | 10/2020 | Bresser | |
| 2020/0332575 A1 | 10/2020 | Christensen | |
| 2020/0362604 A1 | 11/2020 | Jarnicki | |
| 2021/0062558 A1 | 3/2021 | Beck | |
| 2021/0332619 A1 | 10/2021 | Peterson | |
| 2022/0042356 A1 | 2/2022 | Herdering | |
| 2022/0243506 A1 | 8/2022 | Moriyama | |
| 2022/0268063 A1 | 8/2022 | Vrsecký | |
| 2022/0282533 A1 | 9/2022 | Schütz | |
| 2022/0341226 A1 | 10/2022 | Sobecki | |
| 2022/0372798 A1 | 11/2022 | Gröver | |
| 2023/0258029 A1 | 8/2023 | Philippe | |
| 2023/0265707 A1* | 8/2023 | Alneri | E05B 85/18 |
| 2023/0349219 A1 | 11/2023 | Zhao | |
| 2023/0417090 A1 | 12/2023 | Guerin | |
| 2024/0093537 A1 | 3/2024 | Wilke | |
| 2024/0125154 A1 | 4/2024 | Peterson | |
| 2024/0246409 A1 | 7/2024 | Zerbe | |
| 2024/0418018 A1 | 12/2024 | Zhou | |

FOREIGN PATENT DOCUMENTS

| | | | |
|---|---|---|---|
| CN | 109477347 | A | 3/2019 |
| CN | 209723950 | U | 12/2019 |
| CN | 210732313 | U | 6/2020 |
| CN | 211549234 | U | 9/2020 |
| CN | 112443217 | A | 3/2021 |
| CN | 113090142 | A | 7/2021 |
| CN | 115538871 | A | 12/2022 |
| DE | 19642687 | A1 | 4/1998 |
| DE | 19919251 | A1 | 11/2000 |
| DE | 69803826 | T2 | 11/2002 |
| DE | 10249703 | A1 | 5/2004 |
| DE | 19740827 | B4 | 6/2006 |
| DE | 102008019335 | A1 | 10/2008 |
| DE | 102011017240 | A1 | 12/2011 |
| DE | 102010053137 | A1 | 6/2012 |
| DE | 10128866 | B4 | 8/2012 |
| DE | 102013212083 | A1 | 1/2014 |
| DE | 102012020710 | A1 | 4/2014 |
| DE | 102013016885 | A1 | 6/2014 |
| DE | 202014101216 | U1 | 5/2015 |
| DE | 102014103642 | A1 | 8/2015 |
| DE | 102014109738 | A1 | 12/2015 |
| DE | 102015209852 | A1 | 12/2016 |
| DE | 102016112423 | A1 | 1/2017 |
| DE | 202017104635 | U1 | 10/2017 |
| DE | 102016109933 | A1 | 11/2017 |
| DE | 102016110869 | A1 | 12/2017 |
| DE | 102017008108 | A1 | 1/2018 |
| DE | 102017101247 | A1 | 7/2018 |
| DE | 102017210117 | A1 | 12/2018 |
| DE | 102017212397 | A1 | 1/2019 |
| DE | 202019103205 | U1 | 7/2019 |
| DE | 102018109474 | A1 | 10/2019 |
| DE | 102017124368 | B4 | 3/2020 |
| DE | 102018128972 | A1 | 5/2020 |
| DE | 102019106436 | A1 | 9/2020 |
| DE | 102019206282 | A1 | 11/2020 |
| DE | 202021001685 | U1 | 6/2021 |
| DE | 102020106168 | A1 | 9/2021 |
| DE | 102020117046 | B3 | 9/2021 |
| DE | 102020113492 | A1 | 11/2021 |
| DE | 102020209655 | A1 | 2/2022 |
| DE | 102020130235 | A1 | 5/2022 |
| DE | 102022105502 | A1 | 9/2022 |
| DE | 102021002425 | A1 | 11/2022 |
| DE | 202022104963 | U1 | 12/2022 |
| DE | 102017126077 | B4 | 1/2023 |
| DE | 202023104889 | U1 | 11/2023 |
| DE | 102020209607 | A1 | 12/2023 |
| DE | 102020209609 | A1 | 2/2024 |
| DE | 202024100401 | U1 | 2/2024 |
| DE | 202024100582 | U1 | 3/2024 |
| DE | 202024100584 | U1 | 3/2024 |
| DE | 102023118359 | A1 | 1/2025 |
| EP | 0681075 | A2 | 11/1995 |
| EP | 1081319 | A1 | 3/2001 |
| EP | 1186734 | A1 | 3/2002 |
| EP | 1402138 | B1 | 11/2005 |
| EP | 1944436 | A2 | 7/2008 |
| EP | 2032782 | B1 | 8/2010 |
| EP | 2032783 | B1 | 8/2010 |
| EP | 2259984 | A1 | 12/2010 |
| EP | 3122967 | A1 | 2/2017 |
| EP | 2808467 | B1 | 3/2017 |
| EP | 2663705 | B1 | 7/2017 |
| EP | 3421701 | A1 | 1/2019 |
| EP | 3421702 | A1 | 1/2019 |
| EP | 3426869 | A1 | 1/2019 |
| EP | 2775076 | B1 | 9/2019 |
| EP | 3620599 | A1 | 3/2020 |
| EP | 2646277 | B1 | 4/2020 |
| EP | 3712362 | A1 | 9/2020 |
| EP | 3734002 | A1 | 11/2020 |

(56) References Cited

FOREIGN PATENT DOCUMENTS

| | | | |
|---|---|---|---|
| EP | 3803007 | A1 | 4/2021 |
| EP | 3322870 | B1 | 10/2021 |
| EP | 3430217 | B1 | 1/2022 |
| EP | 3681750 | B1 | 4/2022 |
| EP | 4019312 | A1 | 6/2022 |
| EP | 4258312 | A2 | 10/2023 |
| FR | 3034802 | A1 | 10/2016 |
| FR | 3054582 | A1 | 2/2018 |
| FR | 3071861 | A1 | 4/2019 |
| FR | 3096713 | A1 | 12/2020 |
| JP | S629655 | U | 1/1987 |
| JP | 2019027076 | A | 2/2019 |
| JP | 2019090196 | A | 6/2019 |
| KR | 100931160 | B1 | 12/2009 |
| WO | 9952727 | A1 | 10/1999 |
| WO | 0034604 | A1 | 6/2000 |
| WO | 0208550 | A2 | 1/2002 |
| WO | 0229184 | A1 | 4/2002 |
| WO | 2011047649 | A1 | 4/2011 |
| WO | 2012021782 | A2 | 2/2012 |
| WO | 2012151403 | A1 | 11/2012 |
| WO | 2015114154 | A2 | 8/2015 |
| WO | 2015144526 | | 10/2015 |
| WO | 2016077068 | A1 | 5/2016 |
| WO | 2017211500 | A1 | 12/2017 |
| WO | 2018219268 | A1 | 12/2018 |

* cited by examiner

100

VEHICLE DOOR ACTUATING APPARATUS WITH A LARGE ACTUATING SURFACE

RELATED APPLICATION

The present application claims the benefit of German Patent Application No. 10 2022 124 289.7, filed Sep. 21, 2022, titled "Vehicle Door Actuator with Large Actuating Surface," the contents of which are hereby incorporated by reference.

BACKGROUND

WO 2016/077068A1 discloses such a vehicle door actuating apparatus for a microswitch, in particular wherein it is noteworthy that the possible actuating surface, on which a user can push to actuate the switch, is very large relative to the size of the switch, but a good pressure point is nevertheless provided at each point of the surface.

In order to improve the prior art according to WO 2016/077068A1, in DE 10 2017 124 368B4, an easily produced vehicle door switch actuating apparatus is provided, in which the switch is also actuatable over a large surface region. A further advantage according to DE 10 2017 124 368B4 is that only a small amount of space is required below the actuating surface. Although the solution according to DE '368 B4 saves installation space below the actuating surface, a relatively large installation depth within the vehicle frame is still necessary for such a vehicle door switch actuating apparatus.

Based on the situation as described above, the problem addressed by the present invention is to provide a vehicle door switch actuating apparatus that implements the advantages of the solution shown in DE '368 B4 in the smallest possible design space.

SUMMARY

The present disclosure relates generally to a switch actuating apparatus, substantially as illustrated by and described in connection with at least one of the figures, as set forth more completely in the claims. In particular for vehicle doors. According to a further aspect, the present invention relates to a door handle module and a vehicle door having the vehicle door actuating apparatus.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
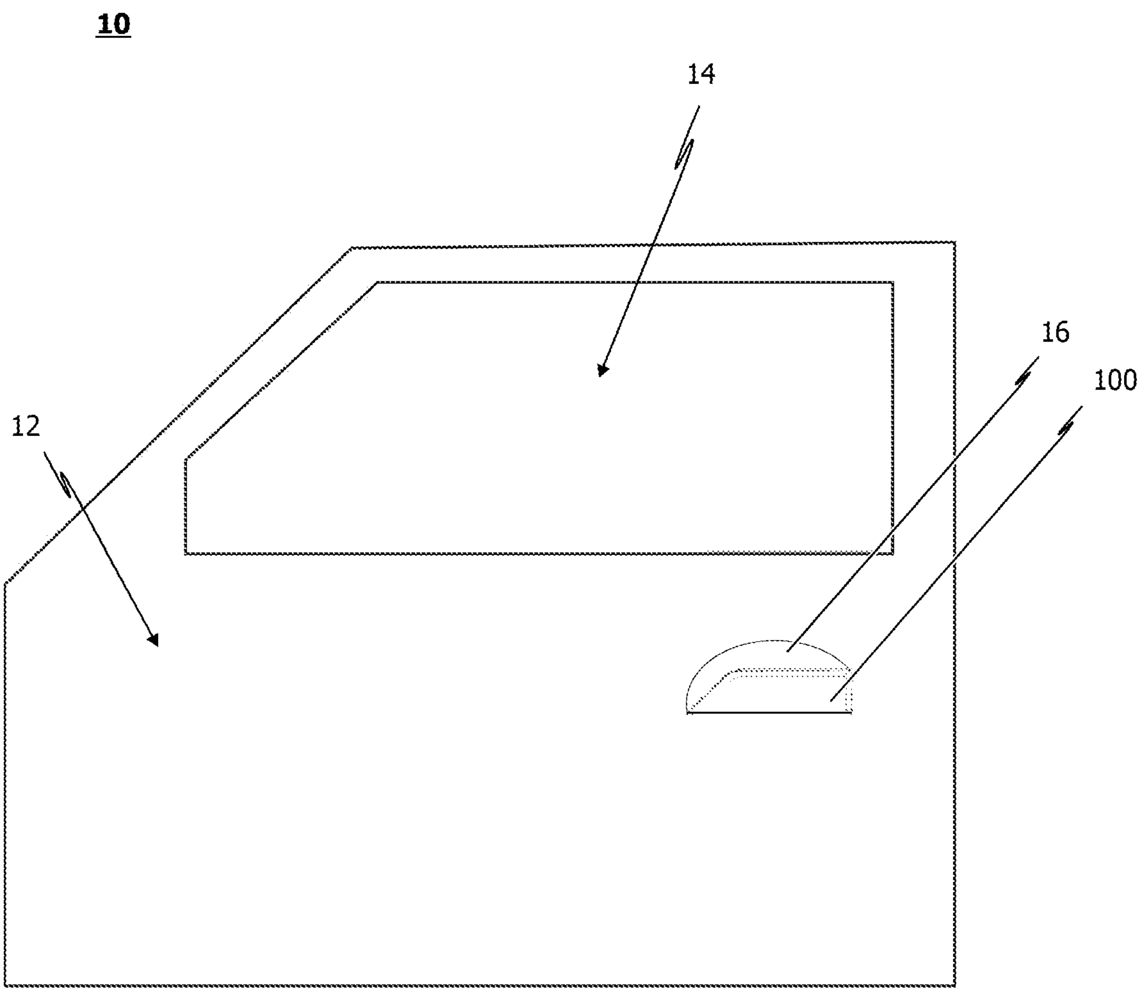
FIG. 1 illustrates a perspective outer view of a vehicle door according to one embodiment of the present invention.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

Accordingly, the present invention relates to a vehicle door actuating apparatus, wherein the vehicle door actuating apparatus comprises an actuating surface, a sensor, in particular an inductive sensor or switch, and a mechanism for transmitting a compressive force applied by a user to the actuating surface into a movement that is detectable by the sensor, wherein the mechanism comprises the following: a first component or a first component group on which the switch is at least partially fixed; and a transmission element, which is pivotally arranged on the first component or the first component group and is pivotable between a home position in which the sensor is not triggered by the transmission element and an actuating position in which the sensor is triggered by the transmission element, and wherein the transmission element is movable relative to the actuating apparatus, wherein the vehicle door actuating apparatus comprises a plurality of actuating elements arranged in relation to the transmission element in such a way that a movement of at least one of the actuating elements relative to the transmission element is sufficient in order to transfer the transmission element from its home position into its actuating position.

By arranging a plurality of actuating elements on the actuating apparatus, the transmission element can be reliably pivoted at any time in order to activate the sensor. In this respect, it is irrelevant for the plurality of actuating elements at which point of the actuating surface the user activates the actuating apparatus. Thus, even with a large actuating surface, it is always ensured that the sensor is reliably activated.

According to a further embodiment, at least two of the actuating elements have a different shape. The different shapes of the actuating elements allow the transmission element to be moved differently at various points. For example, actuating elements that are further away from a pivot axis of the transmission element can be configured such that they result in greater deflection of the transmission element. Thus, despite different distances from the pivot axis, it is achieved that the transmission element is, in each case, pivoted far enough in order to be able to activate the sensor.

According to a further embodiment, the transmission element is plate-shaped. Due to the plate-shaped configuration of the transmission element, the vehicle door actuating apparatus can be configured particularly flat. This saves design space.

According to a further embodiment, the transmission element extends in a plane that is parallel to the actuating surface of the actuating apparatus. This can save further design space.

According to a further embodiment, the transmission element comprises a plurality of actuating apertures, wherein each of the actuating apertures is configured so as to receive one of the actuating elements upon actuation of the actuating apparatus. The actuating apertures can be adapted to the shape of the different actuating elements. For example, the apertures for larger actuating elements can be larger, while smaller actuating elements cooperate with correspondingly smaller actuating apertures. On the one hand, due to the interaction of the actuating apertures with the actuating elements, it is achieved that the pivot region of the transmission element is precisely definable. On the other hand, a guidance of the actuating apparatus relative to the transmission element is also achieved.

According to a further embodiment, the actuating apertures are at least partially funnel-shaped. Accordingly, the actuating apertures can be used as centering aids for centering the actuating elements upon movement of the actuating apparatus relative to the transmission element.

According to a further embodiment, the actuating elements are at least partially cone-shaped, in particular such that oblique surfaces of the actuating elements have substantially the same inclination as the funnel-shaped regions of the actuating apertures. As will be explained in further detail below, a particularly reliable contact between the actuating elements and the transmission element can be achieved by the funnel-shaped and cone-shaped configuration of the actuating apertures and the actuating elements, respectively. Further, by adjusting the inclination, the pivot range of the transmission element can be precisely adjusted.

According to a further embodiment, the vehicle door actuating apparatus comprises a resetting element configured so as to bias the transmission element into its home position. Due to the special arrangement of the transmission element with respect to the actuating elements of the actuating apparatus, this resetting element can also be used in order to bias the actuating apparatus into its home position, that is to say into a non-actuated position. In other words, an activation of the sensor by the actuating apparatus will in particular occur contrary to the resetting force of the resetting element.

According to a further embodiment, the plurality of actuating elements is arranged on a rear side of the actuating surface. In other words, the actuating elements are a part of the actuating surface, thereby saving further design space and improving the transmission of force.

According to a further aspect, the present invention relates to a door handle module, wherein the door handle module comprises a vehicle door actuating apparatus according to the embodiments discussed above.

According to a further aspect, the present invention relates to a vehicle door, wherein the vehicle door comprises a vehicle door actuating apparatus according to any one of the aforementioned embodiments or a door handle module.

The invention will be described in further detail below with reference to the illustrations shown in the figures.

FIG. 1 shows an embodiment of a vehicle door 10 according to one embodiment of the present disclosure. The schematically illustrated vehicle door 10 comprises a vehicle outer skin 12, which is visible outside of the vehicle. The vehicle door 10 further comprises a window 14, which can be retracted inside the vehicle outer skin 12, for example.

In the embodiment illustrated herein, a vehicle door actuating apparatus 100 is attached to the vehicle outer skin. Only a sub-region of the vehicle door actuating apparatus 100 is shown in FIG. 1. For example, an anchoring region (e.g., a beam element) of the vehicle door actuating apparatus 100 can be attached inside the vehicle outer skin 12 in order to support the vehicle door actuating apparatus.

On the one hand, the vehicle door actuating apparatus 100 serves to generate an electrical signal, for example, for locking and unlocking the vehicle door 10. Such electrical signals can be used by a control apparatus in order to activate the vehicle door lock. For this purpose, the vehicle door actuating apparatus comprises a sensor, which will be explained in further detail below. For example, the electrical signal can be activated by touching or pushing on a portion of the vehicle door actuating apparatus.

In some embodiments, the vehicle door actuating apparatus can simultaneously be configured as a handle, which can be used by the user in order to open the vehicle door after unlocking. For example, the vehicle door actuating apparatus 100 can be configured such that a cavity is produced between a handle region of the vehicle door actuating apparatus 100 and the vehicle outer skin, into which the user can engage in order to open the door. In FIG. 1, this is illustrated schematically by an indentation 16 of the vehicle outer skin 12 extending behind the vehicle door actuating apparatus 100 in order to allow the user to rearwardly engage with the vehicle door actuating apparatus 100.

Figure 2:
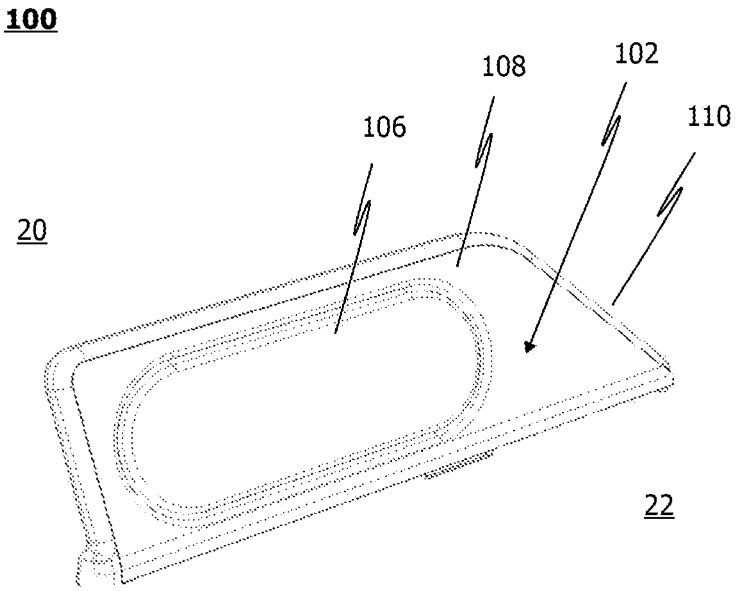
FIG. 2 illustrates an embodiment of a vehicle door actuating apparatus according to an embodiment of the present invention.

FIG. 2 shows a perspective view of one embodiment of the vehicle door actuating mechanism 100. The vehicle door actuating apparatus 100 has an actuating region 102. The actuating region 102 is connected to a beam element, not shown here, in particular integrally. The beam element serves to secure the actuating region 102 on the vehicle frame, particularly on an inner side of the vehicle outer skin (12, FIG. 1). For this purpose, the beam element can comprise a plurality of fastening apertures.

The actuating region 102 can extend in particular obliquely to a longitudinal direction of the beam element. In other words, the actuating region 102 is slightly angled relative to the beam element, namely toward an outer skin 20 of the vehicle door. Due to this inclination, the actuating region 102 in the installed state (FIG. 1) protrudes from the outer surface of the vehicle door (for example, from the outer skin 12 in FIG. 1), so that a clearance is produced between an actuating surface 106 of the actuating apparatus 102 and the vehicle door outer surface, which can be used by the user in order to rearwardly engage with the actuating region 102 and pull open the door 10 after it is unlocked.

The actuating region 102 comprises a cover 110. The cover 110 comprises an actuating surface 106. The actuating surface 106 is connected to the remaining cover via a flexible element 108, for example a rubber seal. The cover 110 as well as the actuating surface 106 are preferably made of a solid material, for example plastic or metal. Accordingly, the movement of the actuating surface relative to the cover 110 results from the elastic element 108 surrounding the actuating surface 106. The user can thus push on the actuating surface 106 opposite the cover 110 in order to achieve an actuation of the sensor (e.g., microswitch 140, FIG. 3).

Of course, in an embodiment not shown, it is also conceivable to configure the cover completely as an actuating surface. For example, the cover 110 could be formed entirely from a flexible material for this purpose.

Figure 3:
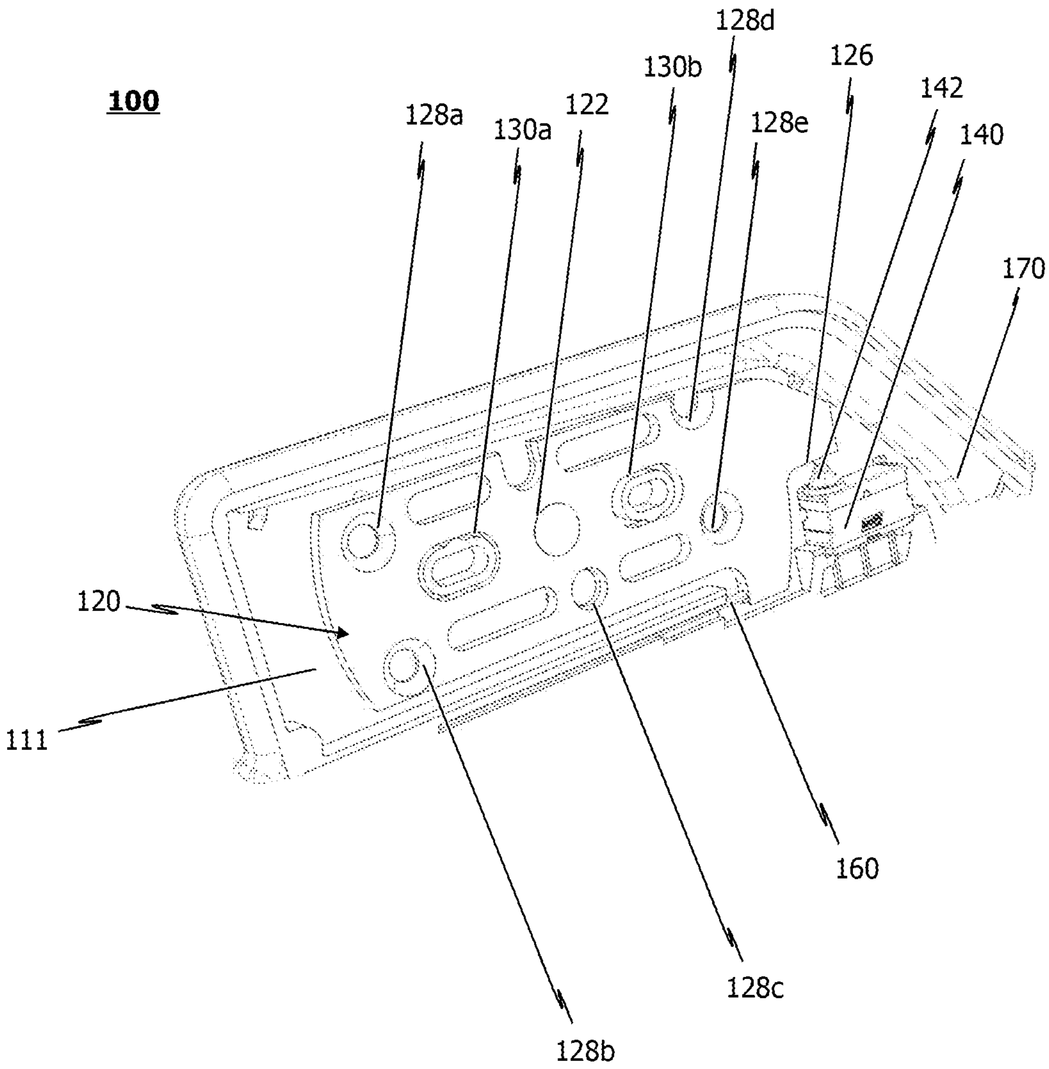
FIG. 3 illustrates enlarged sectional view of an actuating region of the vehicle door actuating apparatus according to FIG. 2.

FIG. 3 shows a perspective view of the vehicle door actuating apparatus 100 corresponding to FIG. 2, wherein the cover 110 has been removed along with the actuating surface 106 in order to show a mechanism for transmitting a compressive force applied by a user on the actuating surface 106 to the sensor. The mechanism comprises in particular a transmission element 120 arranged behind the cover 110. The transmission element 120 is thus received in a cavity of the vehicle door actuating apparatus 100, behind the cover 110. The cavity is defined by the cover 110 on the one hand and a first component 111 or a first component group on the other hand. The first component 111 can also be understood as a housing, which on the one hand supports the transmission element 120 and on the other hand is connected to the beam element.

The transmission element 120 is pivotally arranged on the first component 111. In particular, the transmission element 120 comprises an aperture (through-hole) 122 for this purpose, which serves to receive an axis of rotation (136, FIG. 5) of the first component 111, said axis of rotation being configured as bearing bolts. Accordingly, the transmission element 120 is pivotable relative to the axis of rotation formed by the bearing bolt.

The sensor shown in the figures is configured merely by way of example as a switch 140, in particular a microswitch. It is noted, however, that any other sensor, such as an inductive or optical sensor, can be provided in place of the switch 140 and can be activated by the transmission element 120. In other words, the present disclosure is expressly not limited to a particular type of sensor.

The transmission element has a sensor actuating region 126, which serves to actuate a push-button 142 of the microswitch 140 when the transmission element 120 is pivoted relative to the first component 111. In particular, the transmission element 120 is configured and arranged within the vehicle door actuating apparatus 100 such that, in the home position shown in FIG. 3, the sensor actuating region 126 does not actuate the push-button 142 of the switch 140. However, the sensor actuating region 126 of the transmission element 120 can already be in contact with the push-button 142 when in the home position.

The vehicle door actuating apparatus 100 according to FIG. 3 further comprises a resetting element 160, in particular a wire spring, which biases the transmission element 120 into its home position shown in FIG. 3. In other words, the resetting element 160 prevents unwanted activation of the microswitch 140 due to, for example, gravity, i.e., without a user actuation of the actuating surface 106.

The transmission element 120 is plate-shaped and extends in a plane that is substantially parallel to the plane of the actuating surface 106. Accordingly, the vehicle door actuating apparatus 100 only requires a small depth of installation, because the transmission element 120 extends in the same direction as the actuating surface 106 and thus has only a small thickness.

The transmission element 120 has a plurality of actuating apertures as well as guidance apertures 128*a*, 128*b*, 128*c*, 128*d*, 128*e*, 130*a*, 130*b*, which are explained in further detail below.

Figure 4:
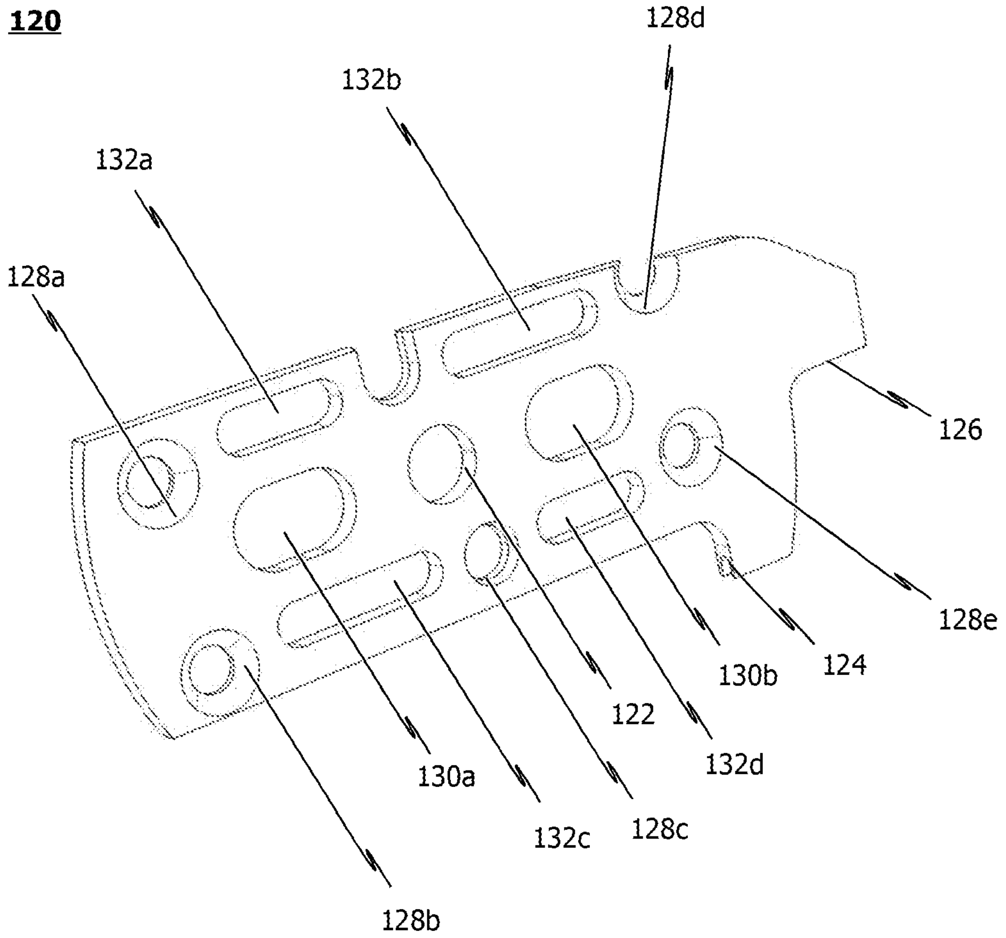
FIG. 4 illustrates perspective view of a transmission element according to the embodiment of FIG. 2.

An enlarged perspective view of the transmission element 120 can be seen in FIG. 4. The transmission element comprises a first through-hole 122 for this purpose, which serves to receive the axis of rotation of the first component 111, said axis of rotation being configured as bearing bolts. A plurality of actuating apertures 128*a* to 128*e* are arranged around the through-hole 122. Each of the actuating apertures 128*a* to 128*e* serves to receive a corresponding actuating element of the actuating region 102 as soon as the actuating surface 106 is pushed in by the user.

The actuating apertures 128*a* to 128*e* can have a shape corresponding to the actuating elements, for example a corresponding opening radius. The actuating apertures 128*a* to 128*e* are in particular funnel-shaped. In other words, each of the actuating apertures has a funnel-shaped region surrounding the through-holes. The funnel-shaped region is in particular arranged on a surface of the transmission element 120 facing the actuating region 102. In some embodiments, the funnel-shaped regions of the various through-holes 128*a* to 128*e* are of different sizes and have different inclinations in order to control the pivoting behavior of the transmission element 120 upon penetration of the actuating elements.

The transmission element 120 further comprises a plurality of guidance apertures 130*a*, 130*b*, 132*a*, 132*b*, 132*c*, 132*d*, which serve to align the transmission element 120 with respect to the first component 111 and/or with respect to the actuating region 102. For example, first guidance elements 130*a*, 130*b* can be provided in order to align the transmission element 120 relative to the first component 111 and/or to limit a rotational path of the transmission element 120 with respect to the first component 111. Second guidance apertures 132*a* to 132*d*, on the other hand, can serve to align the transmission element 120 with respect to the actuating region 102, and in particular with respect to the actuating elements.

Returning to FIG. 3, an optical fiber 170 is further shown, which extends in the edge region of the first component 111, i.e., outside of the transmission element 120. It serves as a backlight for the vehicle door actuating apparatus 100. The optical fiber 170 is arranged such that the transmission element 120 is freely rotatable without touching the optical fiber.

Figure 5:
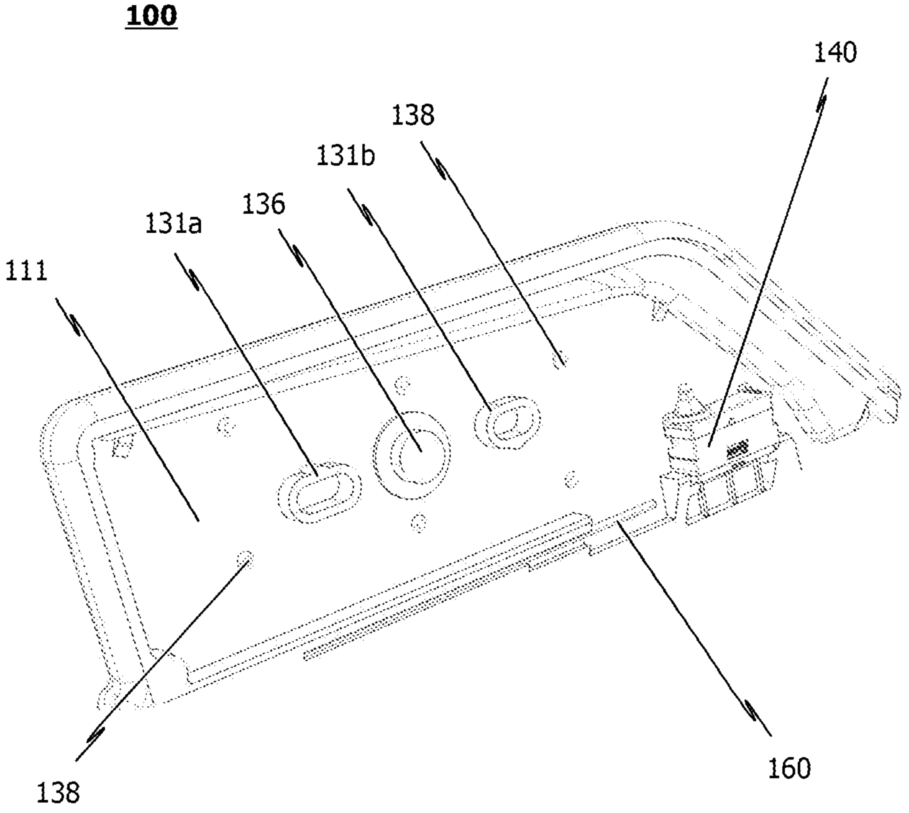
FIG. 5 illustrates sectional view according to FIG. 3, without the transmission element.

FIG. 5 depicts a representation of the vehicle door actuating apparatus without the actuating region 102 and without the transmission element 120. Accordingly, FIG. 5 shows the first component 111, which in FIG. 4 is located behind the transmission element 120. The first component 111 comprises the aforementioned axis of rotation 136, which extends from the first component 111 towards the transmission element 120. In particular, the axis of rotation 136 has a longitudinal axis that is substantially perpendicular to the transmission element 120 and to the actuating surface 106.

The first component further comprises protrusions 131*a*, 131*b* configured so as to be receivable in the first guidance apertures 130*a*, 130*b* of the transmission element 120. The protrusions 131*a*, 131*b* serve to limit a rotation of the transmission element 120 relative to the first component 122 about the axis of rotation 136. In the illustration according to FIG. 3, the first and second protrusions of the first component 111 are received in the corresponding guidance apertures 130*a*, 130*b* of the transmission element 120. It can be seen that the first protrusion arranged in the first transmission aperture 130*a* has, on its base, a degree of play relative to the first guidance aperture 130*a* in the home position of the transmission element 120. Similarly, the second protrusion 131*b* is configured so as to be arranged in the second guidance aperture 130*b* in the transmission element 120 in the home position such that a clearance is formed on its upper side. The clearances of the first and second protrusions 131*a*, 131*b* relative to the guidance apertures 130*a*, 130*b* of the transmission element 120 serve to allow a rotation of the transmission element relative to the first component 111 about the axis of rotation 136, but at the same time to limit it. In the embodiment illustrated herein, a rotation in a clockwise direction, i.e., towards the switch 140, is enabled by the clearances.

The protrusions 131*a*, 131*b* of the first component 111 further serve as a stop in the home position of the transmission element 120. In other words, in the home position of the transmission element 120 shown in FIG. 3, it is biased in a counter-clockwise direction by the resetting element 160 relative to the protrusions 131*a*, 131*b* of the first component 111. Thus, the protrusions 131*a*, 131*b* of the first component 111 in the home position as well as the actuating position serve as a stop for the rotational movement of the transmission element 120.

FIG. 5 further illustrates a plurality of nub-like protrusions 138. The protrusions 138 extend from the first component 111 towards the transmission element 120. The nub-like protrusions 138 serve as slide bearings for the transmission element. In other words, the surface of the transmission element 120 facing away from the actuating surface 106 abuts against the nub-like protrusions and can be pivoted relative to the nub-like protrusions 148. The nub-like protrusions reduce a frictional force that contradicts a pivoting of the transmission element 120.

Figure 6:
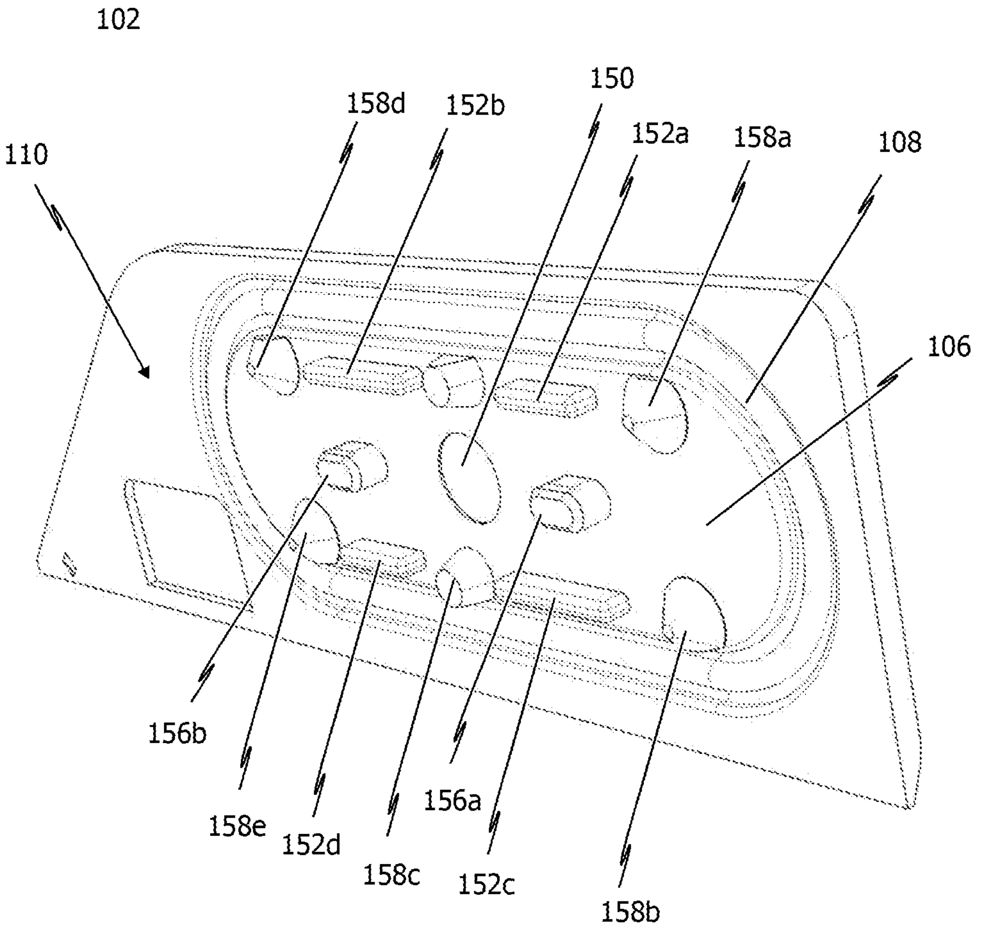
FIG. 6 illustrates rear view of an actuating apparatus according to the embodiment of FIG. 2.

FIG. 6 shows a rear side of the actuating region 102. FIG. 6 also shows the cover 110 having the actuating surface 106. The actuating surface 106 is connected to the cover 110 via the elastic region 108. A plurality of actuating elements 158*a*, 158*b*, 158*c*, 158*d*, 158*e* are arranged on the rear face of the actuating surface 106. The actuating elements 158*a* to 158*e* are configured so as to transfer the transmission element 120 between its home position and its actuating position. In particular, the actuating elements 158*a* to 158*e* are configured such that, when the user presses on the actuating surface 106, a pivoting of the transmission element 120 results due to the insertion of the actuating elements 158*a* to 158*e* into the respective actuating apertures 128*a* to 128*e* of the transmission element 120.

The actuating elements 158*a* to 158*e* are configured so as to be wedge-shaped at least in regions. The actuating elements 158*a* to 158*e* can in particular have a lateral surface with an inclination corresponding to the inclination of the funnel-shaped actuating apertures 128*a* to 128*e* of the transmission element 120. This favors on the one hand the insertion of the actuating elements into the actuating apertures 128*a* to 128*e*, and on the other hand it allows movement of the actuating elements 158*a* to 158*e* onto the transmission element 120 to be converted into a pivoting movement of the transmission element 120, as will be explained in further detail below.

Further, guidance elements 152*a*, 152*b*, 152*c*, 152*d*, 156*a*, 156*b* extending towards the transmission element 120 are provided on the rear side of the actuating region 102, in particular on the rear side of the actuating surface 106. First guidance elements 152*a* to 152*d* are configured so as to be received in guidance apertures 132*a* to 132*d* of the transmission element 120. The guidance elements 152*a* to 152*d* serve to accordingly align the transmission element 120 with respect to the actuating region 102. This also favors the fact that the actuating elements 158*a* to 158*e* are aligned precisely with the corresponding actuating apertures 128*a* to 128*e*, as will be explained in further detail below.

Second guidance elements 156*a*, 156*b* of the actuating region 102 serve to align the actuating region 102 with respect to the first component 111. Accordingly, the second guidance elements 156*a*, 156*b* are configured so as to be receivable in an aperture of the protrusions 131*a*, 131*b* of the first component 111. In particular, the apertures of the protrusions 131*a*, 131*b* of the first component 111 are configured such that the guidance elements 156*a*, 156*b* of the actuating region 102 are only movable within the apertures. A movement of the actuating region 102 towards the plane of the transmission element 120 is prevented by the guidance apertures of the protrusions 131*a*, 131*b*. Thus, only the transmission element 120 is capable of performing a rotational movement relative to the axis of rotation 136.

Figure 7:
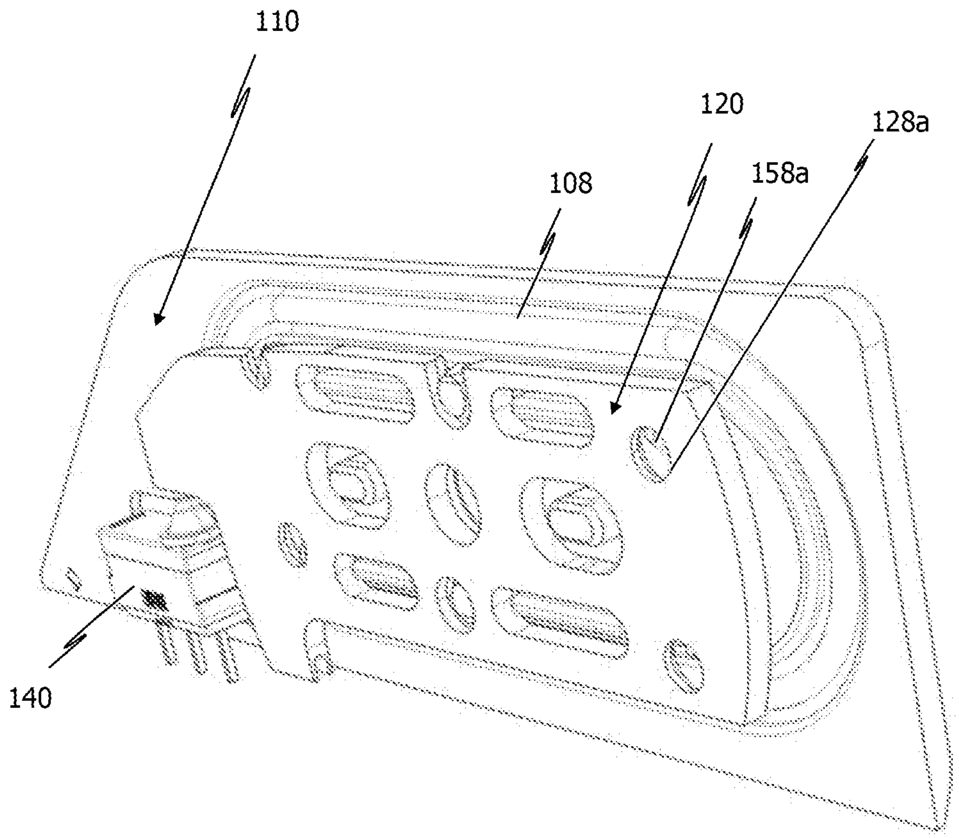
FIG. 7 illustrates rear view of the actuating apparatus according to FIG. 6 with the transmission element and sensor in the home position.

FIG. 7 shows a rear view of the vehicle door actuating apparatus according to FIG. 2, in which the first component 111 has been removed. Accordingly, FIG. 7 shows a rear view of the transmission element 120 in its home position.

As can be seen from FIG. 7, the actuating elements 158*a* to 158*e* as well as the guidance elements 152*a* to 152*d*, 156*a*, 156*b* at least partially extend into the corresponding apertures of the transmission element 120 in its home position.

Figure 8A:
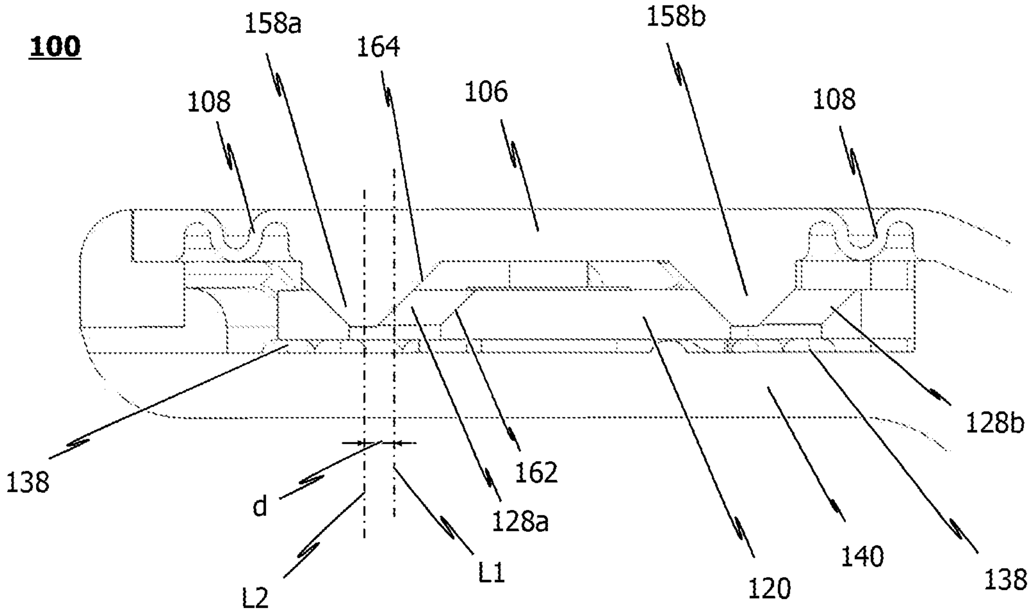
FIGS. 8A and 8B illustrates cross-section through the embodiment of the vehicle door actuating apparatus according to FIG. 2 along a first cutting axis.
Figure 8B:
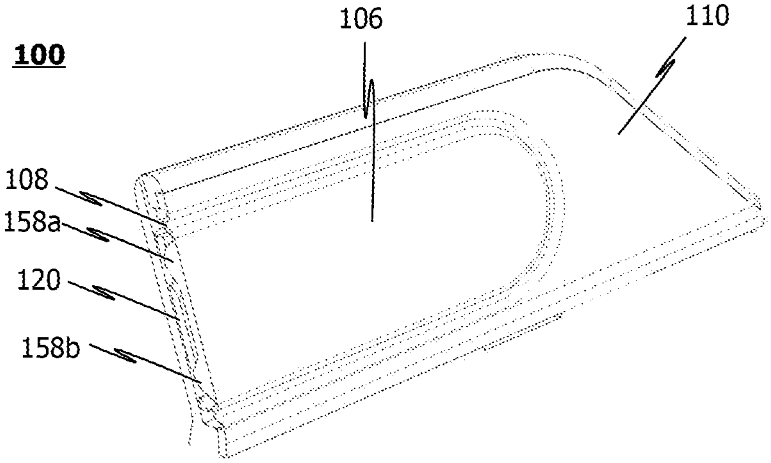
Figure 9A:
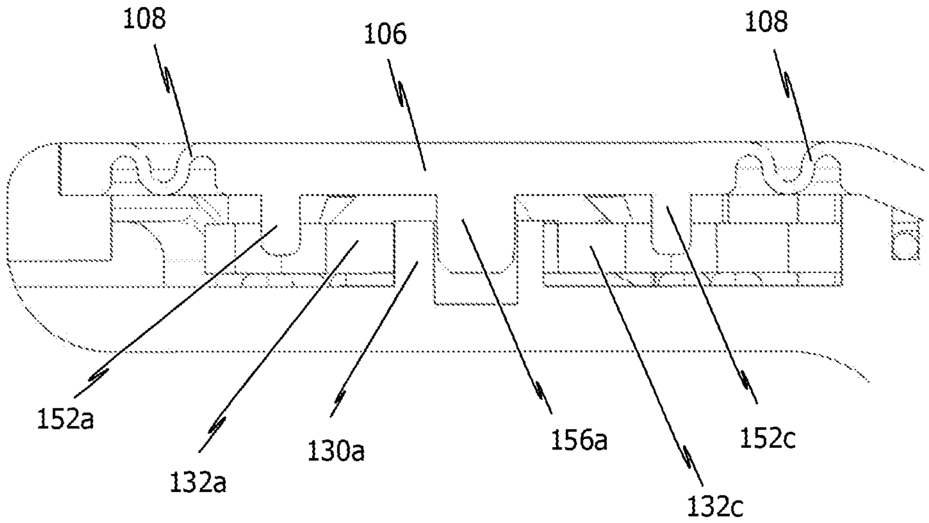
FIGS. 9A and 9B illustrates cross-section through the vehicle door actuating apparatus according to FIG. 2 along a second cutting axis.
Figure 9B:
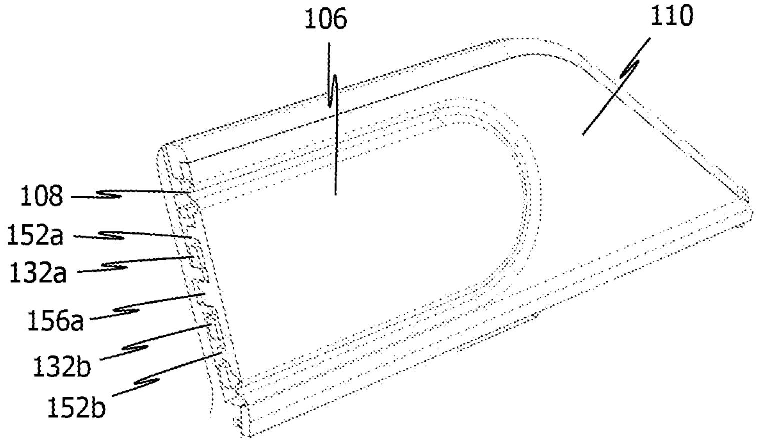

The arrangement of the actuating elements 158*a* to 158*e* and the guidance elements 152*a* to 152*d*, 156*a*, 156*b*, respectively, are shown in the schematic cross-sectional views according to FIGS. 8A, 8B and 9A, 9B. In particular, FIG. 8A shows the arrangement of the actuating elements 158*a*, 158*b* relative to the actuating apertures 128*a*, 128*b* in the home position of the transmission element 120. In the home position shown here, the longitudinal axes L2 of the actuating elements 158*a*, 158*b* are arranged offset from the longitudinal axes L1 of the respective actuating apertures 128*a*, 128*b*. In other words, the actuating elements 158*a* to 158*e* are arranged off-centered from the actuating apertures 128*a* to 128*e* in the home position of the transmission element 120. The longitudinal axes L1 of the actuating apertures are offset by the distance d from the longitudinal axes L2 of the actuating elements.

As already indicated above, a movement of the actuating apparatus, in particular the actuating surface 106, parallel to the actuating surface is not possible, because this is prevented by the connection of the guidance elements 156*a*, 156*b* to the protrusions 131*a*, 131*b*. Thus, when the user presses on the actuating surface 106, it is achieved that the transmission element 120 is displaced in its plane until the longitudinal axes L1 of the actuating apertures 128*a* to 128*e* match the longitudinal axes L2 of the actuating elements 158*a*, 158*b*. This is done by moving the inclinations of the wedge-shaped actuating elements 158*a* to 158*e* along the funnel-shaped regions of the actuating apertures 128*a* to

128*e*. In other words, by pushing on the actuating elements 158*a* to 158*e* when the actuating surface 106 is pressed, the transmission element 120 is displaced by the intersecting inclinations 162, 164 and thus rotated about the axis of rotation 136.

In the home position of the transmission element 120, the actuating elements 158*a* to 158*e* are oriented relative to the actuating apertures such that the transmission element is rotated (clockwise in FIG. 3) towards the switch 140 upon insertion of the actuating elements into the corresponding apertures. As a result, the compressive movement on the actuating surface 106 is converted into a rotational movement or pivoting of the transmission element 120.

Figure 10:
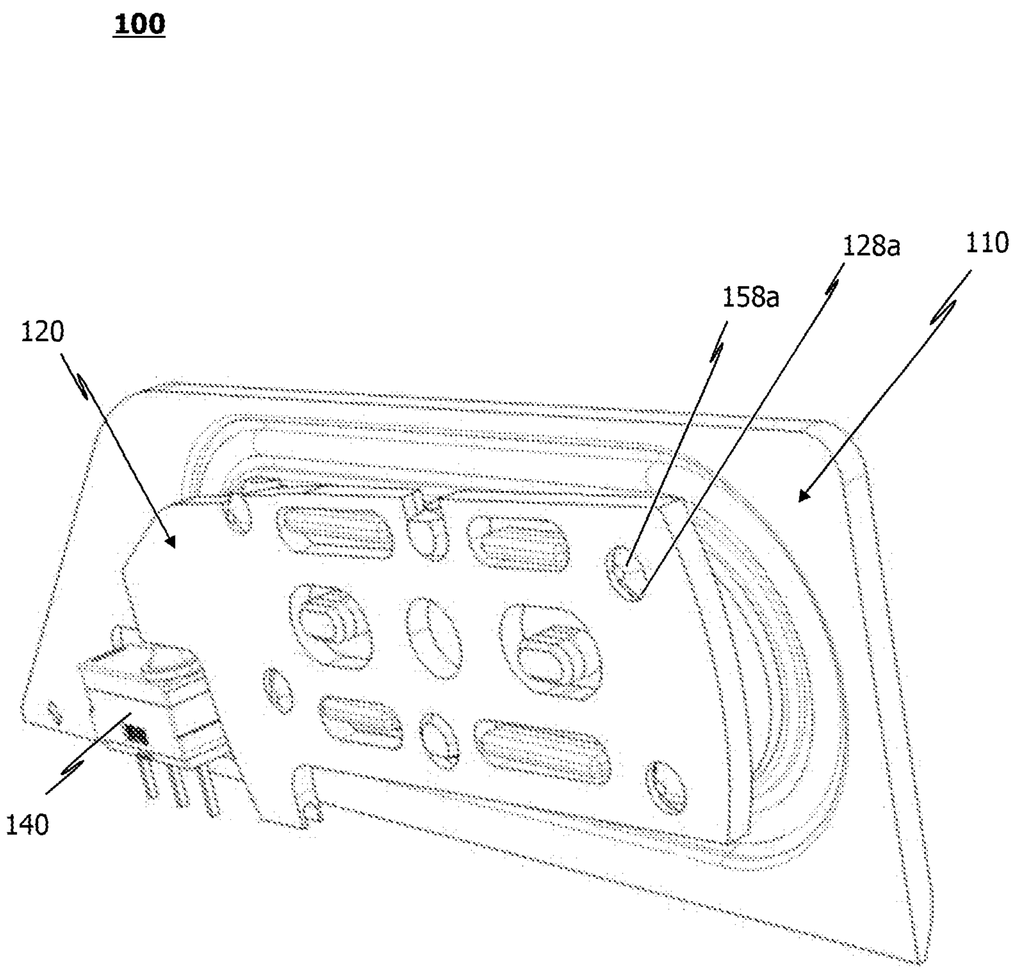
FIG. 10 illustrates rear view according to FIG. 7 in the actuating position of the transmission element.

Once pivoted, the transmission element 120 is in the actuating position shown in FIG. 10, in which the transmission element actuates the push-button of the switch. This, for example, generates an electrical signal for locking or unlocking the vehicle door.

As noted above, the actuating elements 158*a* to 158*e* and associated actuating apertures 128*a* to 128*e* are preferably configured such that the contact of a single actuating element with its corresponding actuating aperture of the transmission element 120 is sufficient in order to transfer the transmission element 120 into the actuating position. This is advantageous, in particular, because the transmission element 120 is intended to reliably actuate the switch 140 even if the user is merely pushing the actuating surface 106 in an edge region.

The person skilled in the art will understand that differently large activation strokes are required in order to transfer the transmission element 120 from its home position into its actuating position, depending on the distance of the actuating elements 158*a* to 158*e* from the axis of rotation 136. Specifically, in the case of actuating elements that are further away from the axis of rotation, it is necessary that they have a greater stroke of movement until the longitudinal axes of the actuating elements match the longitudinal axes of the actuating apertures than is the case for actuating elements that are closer to the axis of rotation. This is in particular based on the length of the lever arm between the individual actuating elements and the axis of rotation.

Accordingly, according to one advantageous embodiment, the actuating elements and/or the actuating apertures are provided having different shapes or diameters. For example, the further the actuating elements or actuating apertures are spaced apart from the axis of rotation 136, the greater the inclinations of the actuating elements or funnels. However, it should be noted again that the inclination of the slopes 162 of the funneled region of the actuating apertures 128*a* to 128*e* correspond to the inclination of the slopes 164 of the respective actuating elements, respectively.

Figure 11:
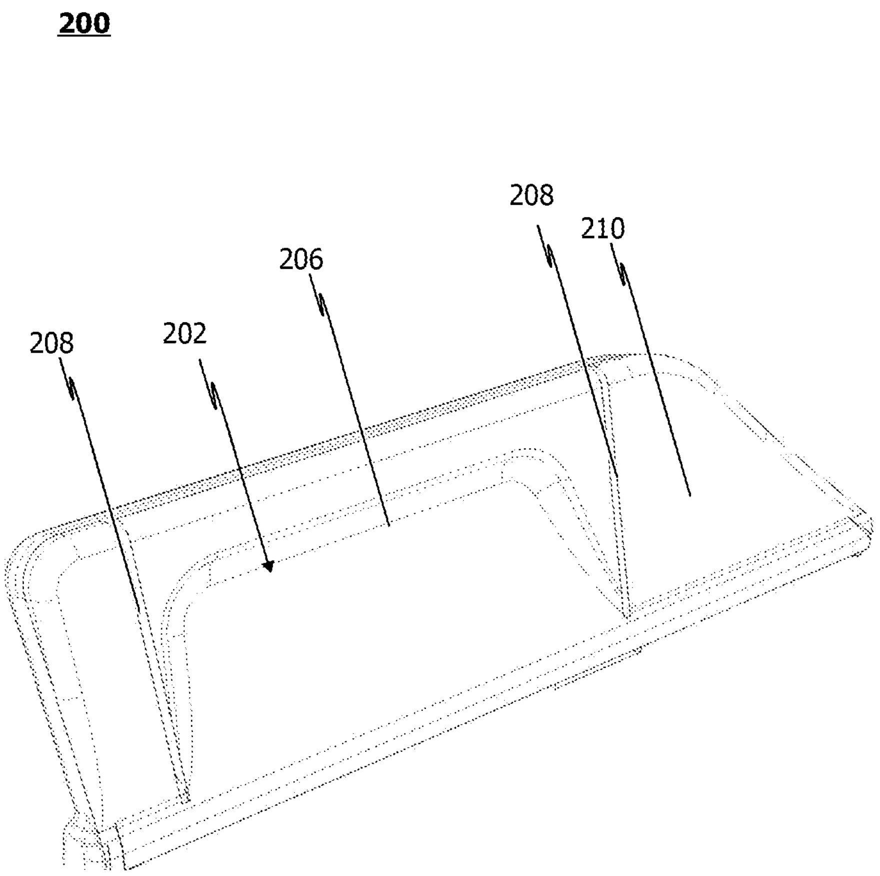
FIG. 11 illustrates front view of a further embodiment of the present invention in the home position.
Figure 12:
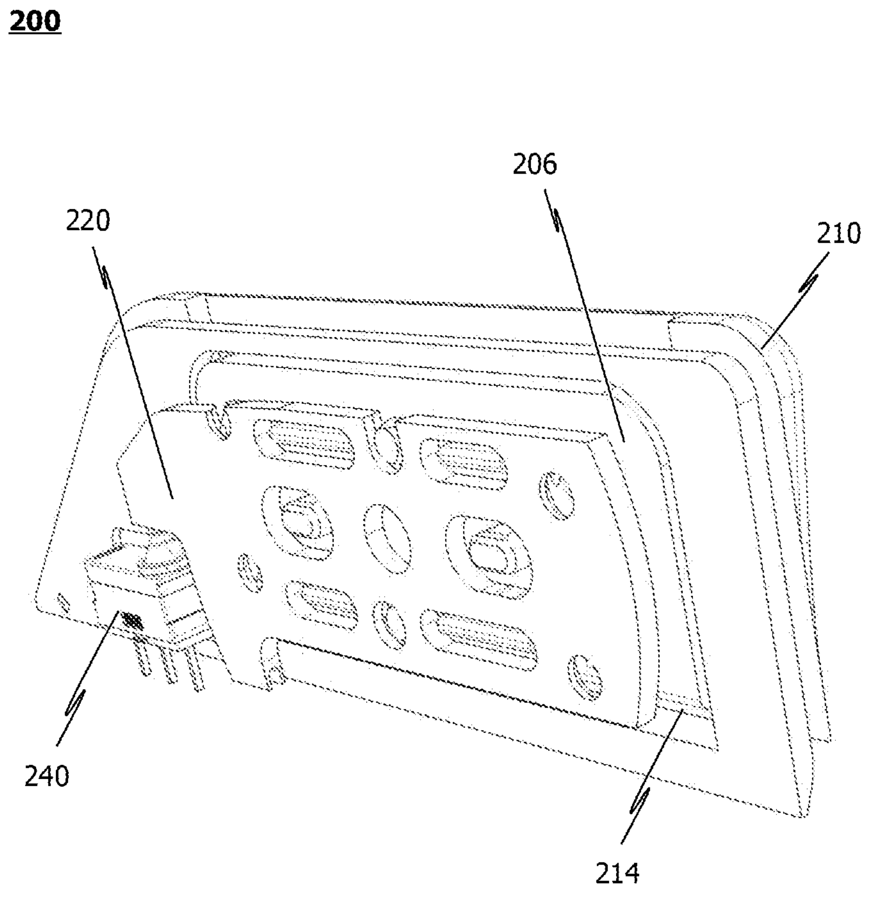
FIG. 12 illustrates schematic, perspective rear view of an actuating apparatus with a transmission element of a vehicle door actuating apparatus according to a further embodiment of the present invention in the home position.
Figure 13:
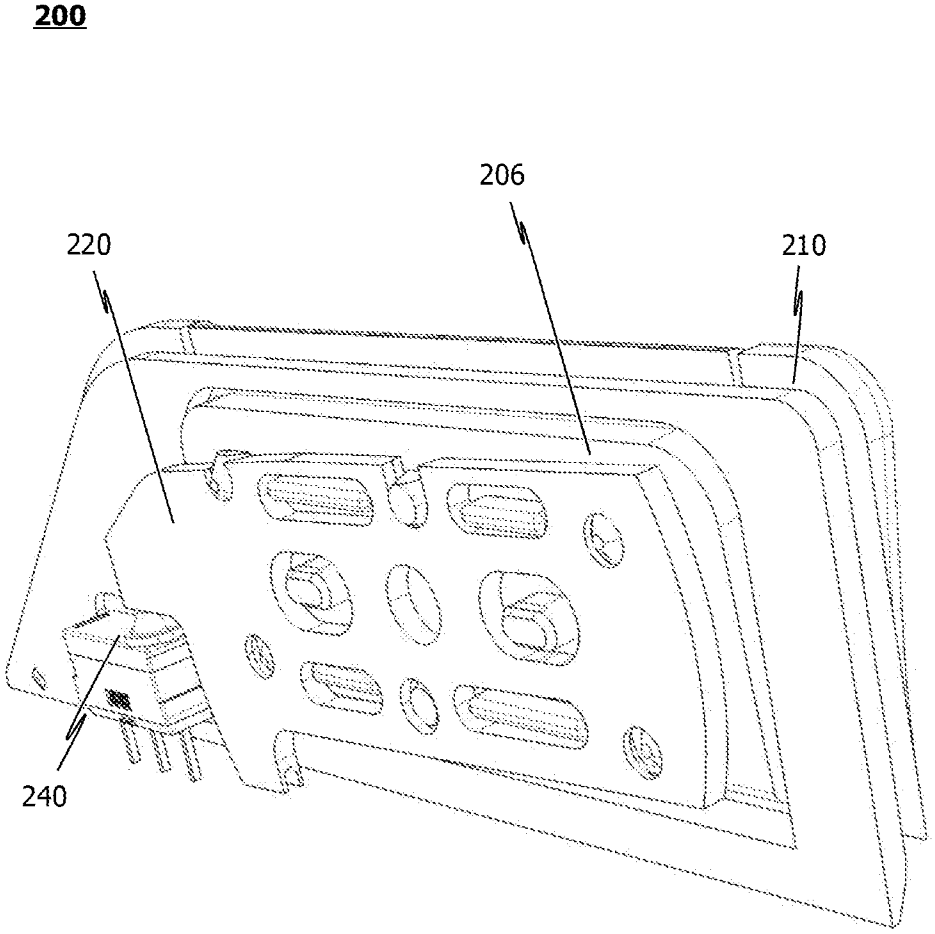
FIG. 13 illustrates perspective rear view of the embodiment according to FIG. 11 in the actuating position of the transmission element.

FIGS. 11 to 13 show a second embodiment of the present vehicle door actuating apparatus. The vehicle door actuating apparatus 200 according to FIGS. 11 to 13 is substantially identical to the vehicle door actuating apparatus 100 according to FIGS. 1 to 10. Only the actuating region 202 of the vehicle door actuating apparatus 200 is different from the actuating apparatus 102 according to FIGS. 1 to 10.

Also, the actuating region 202 according to the embodiment of FIGS. 11 to 13 comprises a cover 210 having an actuating surface 206. However, the actuating surface 206 is not configured as a push-button, which is connected to the cover 210 via a flexible region. Rather, according to the second embodiment, the actuating surface 206 is an actuating flap separated from the cover 210 by slots 208. In other words, the flap-shaped actuating surface 206 according to the second embodiment is also not deformable itself, but can be pivoted onto the first component (not shown here) relative to an axis of rotation 214 shown in FIG. 12.

The mechanism for transmitting a compressive force applied by the user on the actuating surface 206 to the switch 240 is identical to the first embodiment according to FIGS. 1 to 10. Due to the actuation of the actuating surface 206 by the user (i.e., a pressing in), it is achieved that the actuating elements dip into the associated actuating apertures and thus the transmission element 220 is transferred from its home position shown in FIG. 12 to the actuating position shown in FIG. 13.

The present disclosure is not limited to the embodiments shown in the figures, but rather results when all of the features disclosed herein are considered together.

What is claimed is:

1. A vehicle door actuating apparatus, wherein the vehicle door actuating apparatus comprises:

an actuating surface, a sensor, and a mechanism for transmitting a compressive force applied by a user to the actuating surface into a movement that is detectable by the sensor, wherein the mechanism comprises:

a first component or a first component group on which the sensor is at least partially fixed; and a transmission element, which is pivotally arranged on the first component or the first component group and is pivotable between a home position in which the sensor is not triggered by the transmission element and an actuating position in which the sensor is triggered by the transmission element, and wherein the transmission element is movable relative to the actuating surface, wherein the vehicle door actuating apparatus comprises a plurality of actuating elements arranged in relation to the transmission element, wherein the transmission element comprises a plurality of actuating apertures that are at least partially funnel-shaped, wherein each of the actuating apertures is configured so as to receive one of the actuating elements upon actuation of the actuating surface to pivot the transmission element to the actuating position, wherein the plurality of actuating elements are arranged in such a way that inserting a single one of the actuating elements into the transmission element is sufficient in order to transfer the transmission element from its home position into its actuating position, and wherein the actuating elements are at least partially cone-shaped such that oblique surfaces of the actuating elements have substantially the same inclination as the funnel-shaped regions of the actuating apertures.

2. The vehicle door actuating apparatus according to claim 1, wherein at least two of the actuating elements have a different shape.

3. The vehicle door actuating apparatus according to claim 1, wherein the transmission element is plate-shaped.

4. The vehicle door actuating apparatus according to claim 3, wherein the transmission element extends in a plane that is parallel to the actuating surface.

5. The vehicle door actuating apparatus according to claim 1, wherein the vehicle door actuating apparatus comprises a resetting element configured so as to bias the transmission element into its home position.

6. The vehicle door actuating apparatus according to claim 1, wherein the plurality of actuating elements are arranged on a rear side of the actuating surface.

7. The vehicle door actuating apparatus according to claim 1, wherein the transmission element comprises a through-hole configured to receive an axis of rotation of the first component or the first component group, and wherein the plurality of actuating apertures are arranged around the through-hole.

8. The vehicle door actuating apparatus according to claim 1, wherein the transmission element further comprises a plurality of guidance apertures configured to align the transmission element with respect to at least one of the first component, the first component group, and the actuating surface.

9. The vehicle door actuating apparatus according to claim 1, wherein the transmission element comprises a sensor actuating region configured to actuate the sensor when the transmission element is pivoted from the home position to the actuating position.

10. The vehicle door actuating apparatus according to claim 1, wherein the actuating elements are arranged offset from the actuating apertures in the home position of the transmission element such that upon actuation of the actuating surface, the actuating elements engage the funnel-shaped regions of the actuating apertures to convert movement of the actuating surface into a pivoting movement of the transmission element.

11. A door handle module, wherein the door handle module comprises a vehicle door actuating apparatus according to claim 1.

12. A vehicle door, wherein the vehicle door comprises a vehicle door actuating apparatus according to claim 1 or a door handle module according to claim 11.

13. A vehicle door actuating apparatus, wherein the vehicle door actuating apparatus comprises an actuating surface, a sensor and a mechanism for transmitting a compressive force applied by a user to the actuating surface into a movement that is detectable by the sensor, wherein the mechanism comprises:

a first component or a first component group on which the sensor is at least partially fixed; and a transmission element, which is pivotally arranged on the first component or the first component group and is pivotable between a home position in which the sensor is not triggered by the transmission element and an actuating position in which the sensor is triggered by the transmission element, and wherein the transmission element is movable relative to the actuating surface, wherein the vehicle door actuating apparatus comprises a plurality of actuating elements arranged in relation to the transmission element, wherein the plurality of actuating elements are configured to be inserted into the transmission element such that the transmission element pivots to the actuating position, wherein the plurality of actuating elements are arranged in such a way that inserting a single one of the actuating elements into the transmission element is sufficient in order to transfer the transmission element from its home position into its actuating position, wherein at least two of the actuating elements have a different shape.

14. The vehicle door actuating apparatus according to claim 13, wherein the transmission element is plate-shaped.

15. The vehicle door actuating apparatus according to claim 14, wherein the transmission element extends in a plane that is parallel to the actuating surface.

16. The vehicle door actuating apparatus according to claim 13, wherein the transmission element comprises a plurality of actuating apertures, wherein each of the actuating apertures is configured so as to receive one of the actuating elements upon actuation of the actuating surface.

17. The vehicle door actuating apparatus according to claim 16, wherein the actuating apertures are at least partially funnel-shaped.

18. The vehicle door actuating apparatus according to claim 17, wherein the actuating elements are at least partially cone-shaped.

19. The vehicle door actuating apparatus according to claim 17, wherein the actuating elements are at least partially cone-shaped such that oblique surfaces of the actuating elements have substantially the same inclination as the funnel-shaped regions of the actuating apertures.

20. The vehicle door actuating apparatus according to claim 13, wherein the vehicle door actuating apparatus comprises a resetting element configured so as to bias the transmission element into its home position.

* * * * *